United States Patent
Chen et al.

(10) Patent No.: US 6,510,410 B1
(45) Date of Patent: Jan. 21, 2003

(54) METHOD AND APPARATUS FOR RECOGNIZING TONE LANGUAGES USING PITCH INFORMATION

(75) Inventors: Julian Chengjun Chen, White Plains, NY (US); Guo Kang Fu, Beijing (CN); Hai Ping Li, Beijing (CN); Li Qin Shen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 09/627,595

(22) Filed: Jul. 28, 2000

(51) Int. Cl.[7] .................. G10L 15/04; G10L 15/28; G10L 15/12; G10L 11/04
(52) U.S. Cl. .............. 704/251; 704/255; 704/236; 704/207
(58) Field of Search ................. 704/251, 254, 704/243, 207, 255, 236

(56) References Cited

U.S. PATENT DOCUMENTS

| | | | |
|---|---|---|---|
| 5,455,889 A | * 10/1995 | Bahl et al. | 704/254 |
| 5,664,061 A | * 9/1997 | Andreshak et al. | 704/251 |
| 5,680,510 A | * 10/1997 | Hon et al. | 704/255 |
| 5,751,905 A | * 5/1998 | Chen et al. | 704/251 |
| 5,899,971 A | * 5/1999 | De Vos | 704/243 |
| 6,006,175 A | * 12/1999 | Holzrichter | 704/207 |
| 6,038,533 A | * 3/2000 | Buchsbaum et al. | 704/255 |

OTHER PUBLICATIONS

Huang et al ("A Robust Connected Mandarin Speech Recognizer Using Bayesian Neural Networks", International Workshop on Intelligent Signal Processing and Communication Systems, pp. 443–457, Mar., 1992).*

Chen et al2 ("Recognize Tone Languages Using Pitch Information On The Main Vowel Of Each Syllable", International Conference on Acoustics, Speech, and Signal Processing, pp. 61–64, May 2001).*

* cited by examiner

*Primary Examiner*—Richemond Dorvil
*Assistant Examiner*—Daniel Nolan
(74) *Attorney, Agent, or Firm*—F. Chau & Associates, LLP (57) ABSTRACT

A method and an apparatus for automatic recognition of tone languages, employing the steps of converting the words of speech into an electrical signal, generating spectral features from the electrical signal, extracting pitch values from the electrical signal, combining said spectral features and the pitch values into acoustic feature vectors, comparing the acoustic feature vectors with prototypes of phonemes in an acoustic prototype database including prototypes of toned vowels to produce labels, and matching the labels to text using a decoder comprising a phonetic vocabulary and a language model database.

19 Claims, 7 Drawing Sheets

| Name | Pitch chart | Feature | Sample word | |
|---|---|---|---|---|
| | | | English depiction | Chinese characters |
| Yinpíng | — | High | mā | 妈 |
| Yángpíng | / | Rising | má | 麻 |
| Shǎngshēng | ‿ | Low | mǎ | 马 |
| Qùshēng | \ | Falling | mà | 骂 |
| Qingshēng | — | Neutral | ma | 吗 |

Fig. 3 Tones in Mandarin

| I 400 | II 402 | III 404 |
|---|---|---|
| 一级 | Yījí  406 | First Class |
| 一己 | Yījǐ | Self |
| 疑忌 | Yíjì  408 | Suspicion |
| 以及 | Yǐjí | As well as |
| 亦即 | Yìjí | Other words |
| 异己 | Yìjǐ | Dissident |

Fig. 4

| Number | Pitch chart | Feature | Sample word |
|---|---|---|---|
| 1 | ⊡ (high level line) | High level | 三 |
| 2 | ⊡ (rising line) | High rising | 九 |
| 3 | ⊡ (mid level line) | Mid level | 四 |
| 4 | ⊡ (falling line) | Low falling | 零 |
| 5 | ⊡ (rising line) | Low rising | 五 |
| 6 | ⊡ (low level line) | Low level | 二 |
| 7 | ⊡ (high short line) | High short | 七 |
| 8 | ⊡ (mid short line) | Mid short | 八 |
| 9 | ⊡ (low short line) | Low short | 六 |

Fig. 5  Tones in Cantonese

METHOD AND APPARATUS FOR RECOGNIZING TONE LANGUAGES USING PITCH INFORMATION

BACKGROUND

1. Technical Field

The present invention relates generally to speech recognition, and in particular, to a method and apparatus for automatic recognition of words of speech having at least one syllable with tonal content.

2. Description of Related Art

Speech recognition is a technology which converts an acoustic speech signal (human speech) into text. The apparatus which utilizes this technology, usually a computer system with speech recognition software, is called an automatic dictation machine. This technology has found broad applications in speech transcription, voice activated information systems, as well as speech command and control systems. The early successful applications of speech recognition technology involved European languages, such as English, German, Spanish, etc. For such languages, the pitch contours are not phonemic, i.e., different pitch contours do not imply different lexical meanings.

Another category of languages is tone languages, in which each syllable has a tone (pitch contour) associated with it. Tone, by definition, is a property of a syllable. For such languages, the pitch contours are phonemic. This means that syllables having the same sequence of consonant(s) and vowel(s) but different pitch contours represent different morphemes and have entirely different meanings. Examples of tone languages include various Chinese languages (such as Mandarin, Cantonese, Taiwanese or Mĭnnányû), Southeast Asian languages (such as Thai and Vietnamese), Japanese, Swedish, and Norwegian. The Chinese languages have the largest total number of speakers out of all languages, with Mandarin being the main dialect. The second most popular tone language, Cantonese, is spoken in Hong Kong, Guângdŏng province, and by Chinese people outside China.

Because of the vast numbers of characters in some tone languages, especially Chinese, text input into computers using keyboards is especially difficult. Therefore, speech recognition of tone languages is a particularly important alternative, which if realized with reasonable accuracy, speed and price, would be an invaluable tool for revolutionizing computer use for those speaking tone languages.

The traditional method of automatic speech recognition of tone languages usually includes two steps. In the first step, the consonants and vowels are recognized and syllables are constructed from these consonants and vowels; thus the syllables without tone are recognized. In the second step, the pitch contour of each syllable is examined to identify the tone of the syllable. However, such a two-step process often creates errors and in addition, is not compatible with speech recognition systems for European languages; thus its application is limited.

In U.S. Pat. No. 5,751,905, entitled "Statistical Acoustic Processing Method and Apparatus for Speech Recognition Using a Toned Phoneme System", a method was introduced for recognizing tone languages, especially Mandarin. In particular, it disclosed a method in which a syllable was divided into two roughly equal parts, or demisyllables, where the pitch information of the first demisyllable, including the initial consonant and possibly a glide (semivowel), was assumed to be disposable, and the pitch information in the second demisyllable, including the main vowel and the ending, was assumed to be sufficient for determining the tone of the entire undivided syllable. In standard Mandarin, there are 20 different second demisyllables and 5 different tones: high (yinping), rising (yangping), low (shang), falling (qu), and untoned or neutral (qing).

By assigning these tones to each second demisyllable, a total of 114 phonemes with tone (tonemes) could be defined. In the training process, each of the tonemes, or phonemes with different tones, is trained as an independent phoneme, and during the recognition process, the tonemes are recognized as independent phonemes. The tone of a syllable is defined as the tone of the second demisyllable, or the tone of the toneme in that syllable. This method results in a highly accurate Mandarin speech recognition system. The apparatus utilizing the method in U.S. Pat. No. 5,751,905, "VIA-VOICE™ Chinese", was the first continuous Mandarin dictation product developed, and has been the most successful Mandarin dictation product on the market since its debut in 1997.

The method of U.S. Pat. No. 5,751,905 was not as effective in automatic recognition of Cantonese. Cantonese has a significantly greater number of second demisyllables than Mandarin, and has 9 tones (instead of 5 as in Mandarin). Other tone languages, such as Thai and Vietnamese, also have a significantly greater number of second demisyllables than Mandarin. Thus, using the method described above results in a total of almost 300 phonemes that must be defined. Such a large number of phonemes make training and recognition very difficult. In addition, due to "ertification" (an expression used here to describe the process whereby a syllable's ending is changed by adding "r"), the number of second demisyllables with tone in the Beijing dialect also approaches 300. Accordingly, an efficient and accurate automatic speech recognition technique for recognizing tone languages, in particular, those languages having high numbers of endings and tones, is highly desirable.

SUMMARY OF THE INVENTION

The present invention is directed to a method and apparatus for efficient automatic recognition of tone languages. Advantageously, the present invention significantly reduces the total number of phonemes that must be defined, thus simplifying the training process and enabling quicker decoding, while at the same time maintaining or in certain cases, improving accuracy in recognizing speech.

According to an aspect of the present invention, an apparatus for recognition of tone languages is provided including means for defining toned vowels as different phonemes comprising a database comprising prototypes of phonemes including toned vowels, a signal processing unit for generating a vector including a pitch value; and means for recognizing toned vowels by matching said prototypes of phonemes including toned vowels to said vector.

According to another aspect of the present invention, a method for defining toned vowels in words of speech is provided comprising the steps of preparing a training text from said words of speech, transcribing said training text into sequences of phonemes including vowels with tones, converting said training text into an electrical signal, generating spectral features from said electrical signal, extracting pitch values from said electrical signal, combining said spectral features and said pitch values into acoustic feature vectors, and comparing said acoustic feature vectors with said sequences of phonemes including vowels with tone to produce acoustic prototypes for each phoneme.

In yet another aspect of the present invention, a method for identifying toned vowels in words of speech is provided comprising the steps of converting the words of speech into an electrical signal, generating spectral features from said electrical signal, extracting pitch values from said electrical signal, combining said spectral features and said pitch values into acoustic feature vectors, comparing said acoustic feature vectors with prototypes of phonemes in an acoustic prototype database including prototypes of toned vowels to produce labels, and matching said labels to text using a decoder comprising a phonetic vocabulary and a language model database.

These and other aspects, features, and advantages of the present invention will be described or become apparent from the following detailed description of the preferred embodiments, which is to be read in connection with the accompanying drawings.

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate or practice these and similar implementations or configurations of the present invention.

Figure 1:
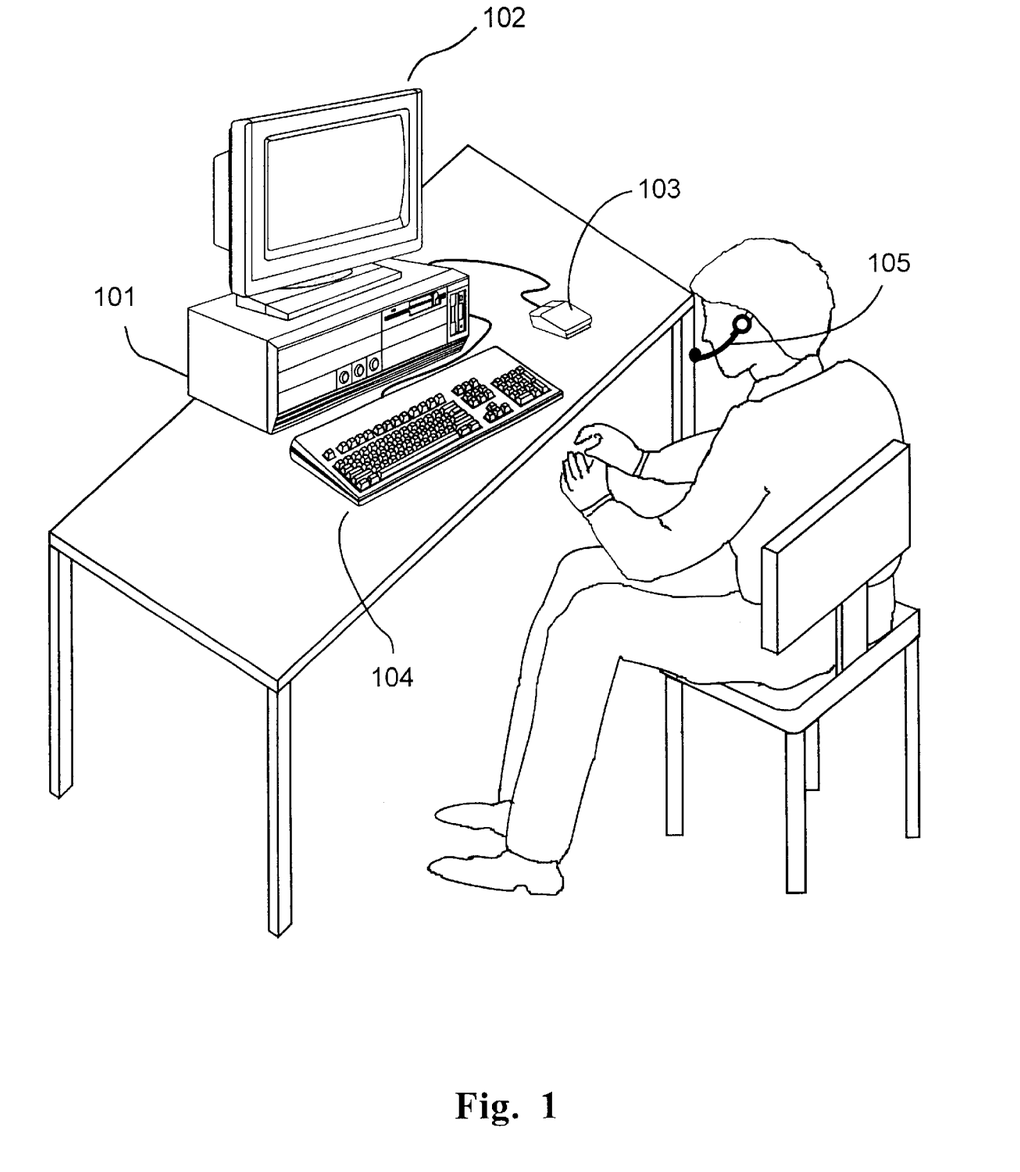
FIG. 1 is an exemplary illustration of an apparatus setup for the speech recognition (machine transcription) of tone languages, according to an embodiment of the present invention.

A system suitable for practice of the present invention is illustrated in FIG. 1. The system includes a computer 101 for performing the function of speech recognition by mapping an acoustic speech signal to text. The computer is connected to a display monitor 102, a mouse 103, and a keyboard 104. A microphone 105 is also connected to the computer and is used to convert voice into an electrical signal, which is then fed into a sound card in computer 101.

Figure 2:
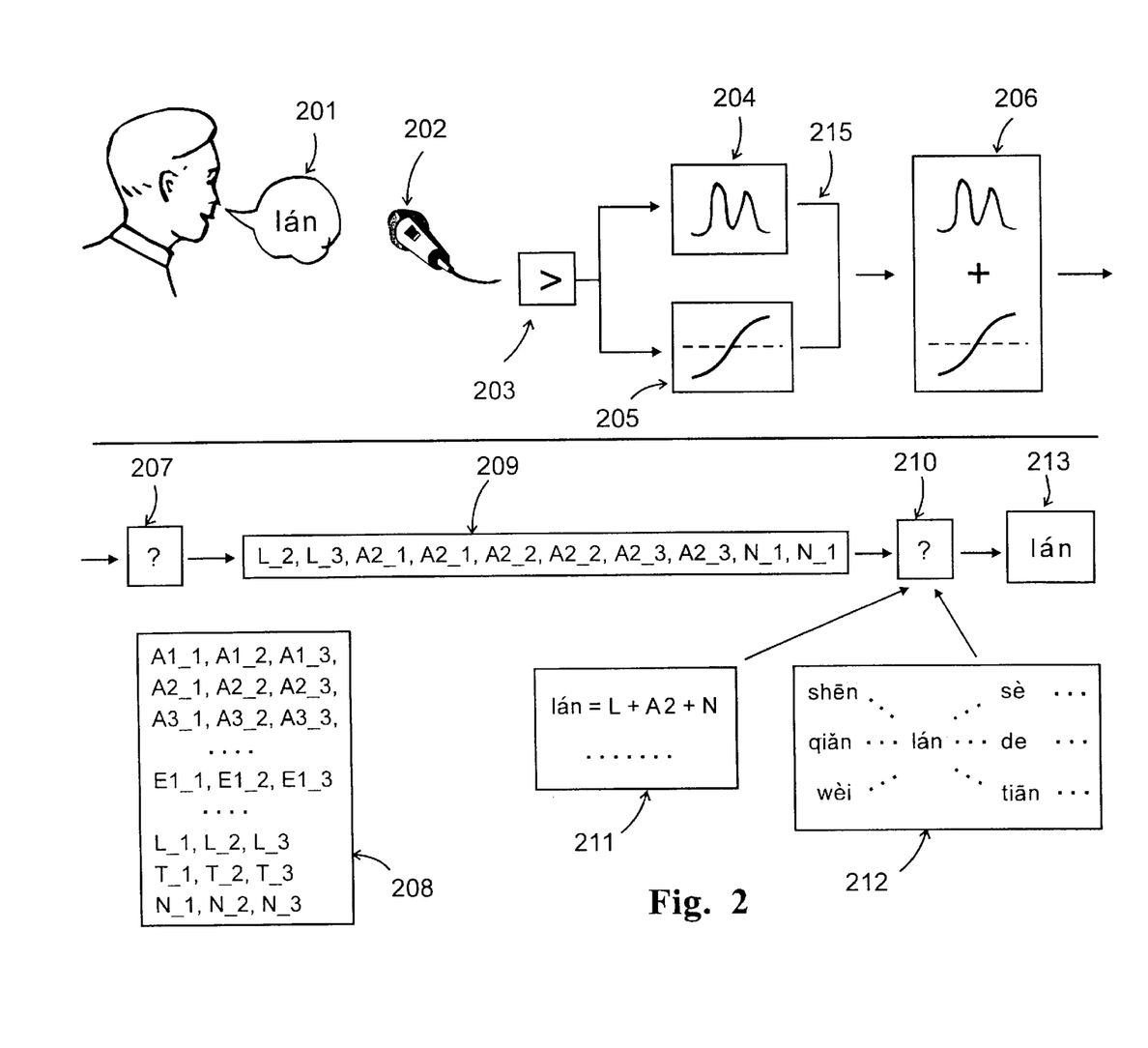
FIG. 2 is a block diagram of a method for speech recognition for tone languages according to an embodiment of the present invention.

FIG. 2 illustrates the major components of speech recognition for tone languages according to an embodiment of the present invention. The components may be implemented as software stored in computer 101. During operation of the system in FIG. 1, a voice signal 201 is converted into an electrical signal via a microphone 202. An A/D converter 203 translates the analog signal from the microphone into a digital signal. A signal processing unit comprising a spectral feature extraction unit 204 and a pitch extraction module 205, extracts condensed information for speech recognition.

The spectral feature extraction unit 204 generates spectral feature vectors, for example, mel frequency cepstral coefficients (MFCC). The spectral feature vectors represent the distribution of energy on a frequency scale. Typically, a set of 12 cepstral coefficients is generated. (See for example, Steven Davis and Paul Mermelstein, "Comparison of Parametric Representations for Monosyllabic Word Recognition in Continuously Spoken Sentences", IEEE Transactions on Acoustics, Speech and Signal Processing, Vol. ASSP-28, No. 4, August 1980, page 357–366.)

In speech technology, pitch is an essential element in regenerating pleasant sounding speech. Pitch is defined as the resonance frequency of the vocal cords at any moment. In particular, for tonal languages pitch is a necessity for enabling accurate speech recognition. The pitch extraction module 205 generates a pitch value for each frame, for example, every 10 milliseconds. The pitch value extracted is expressed as the logarithm of the pitch relative to the average pitch of the speaker; it is called log-relative pitch. To illustrate, typically a female speaker has a higher average pitch than a male speaker. If the pitch of a frame is higher than the average pitch, the logarithm of the relative pitch is positive. If the pitch of a frame is lower than the average pitch, the logarithm of the relative pitch is negative.

The outputs 215 of the pitch extraction module 205 (pitch values) and the spectral feature extraction unit 204 (MFCC) are then combined to form complete acoustic feature vectors 206, which in the present case, are for example, a 13-dimension vector every frame (10 milliseconds).

The acoustic feature vectors 206, with pitch as one of its components, are then fed into a labeler 207. The labeler labels frames automatically by comparing each frame of incoming speech (comprising, for example, a 13-dimension acoustic feature vector) with the acoustic prototypes of all phonemes in the acoustic prototype database 208 to find the closest matching phoneme for each frame. A closest matching phoneme for each frame is called a label. The acoustic prototype database 208 comprises a set of prototypes of different phonemes stored in a database. These prototypes are templates for each individual phoneme and are used as a point of comparison with the frames of incoming speech for assigning labels. The prototypes include vowels having tonal values, for example, a vowel "A" with different tones A1, A2, A3 is depicted in 208. In the acoustic prototype database, each phoneme is divided into three segments, known as early, middle and late segments. Each segment is known as a feneme. For example, a vowel "A" with rising tone, A2, has three fenemes A2_1, A2_2, and A2_3, where the value of log-relative-pitch is mostly negative for A2_1, nearly zero for A2_2, and mostly positive for A2_3.

From the labeling process, a sequence of most likely labels 209, in the order of each incoming frame of the acoustic feature vector is generated. The labels are then fed into a decoder 210, comprising a phonetic vocabulary 211 and a language-model database 212, to find the most likely text 213 for the incoming voice signal. The phonetic vocabulary 211 comprises a database of words with tone information and is used for determining matching words for sequences of labels. The language model database, for example, may predict the probability of a third word by examining the two words prior to the third word. The probability of a word determined by the language model database is then combined with the labels and the phonetic vocabulary to predict the most likely text 213.

Since pitch is a component of the acoustic feature vector, for frames with identical spectral features but different pitch, the labeler 207 will point to different tonemes, that is, the same vowel but with different tones (A1, A2 or A3, etc.).

Figure 7:
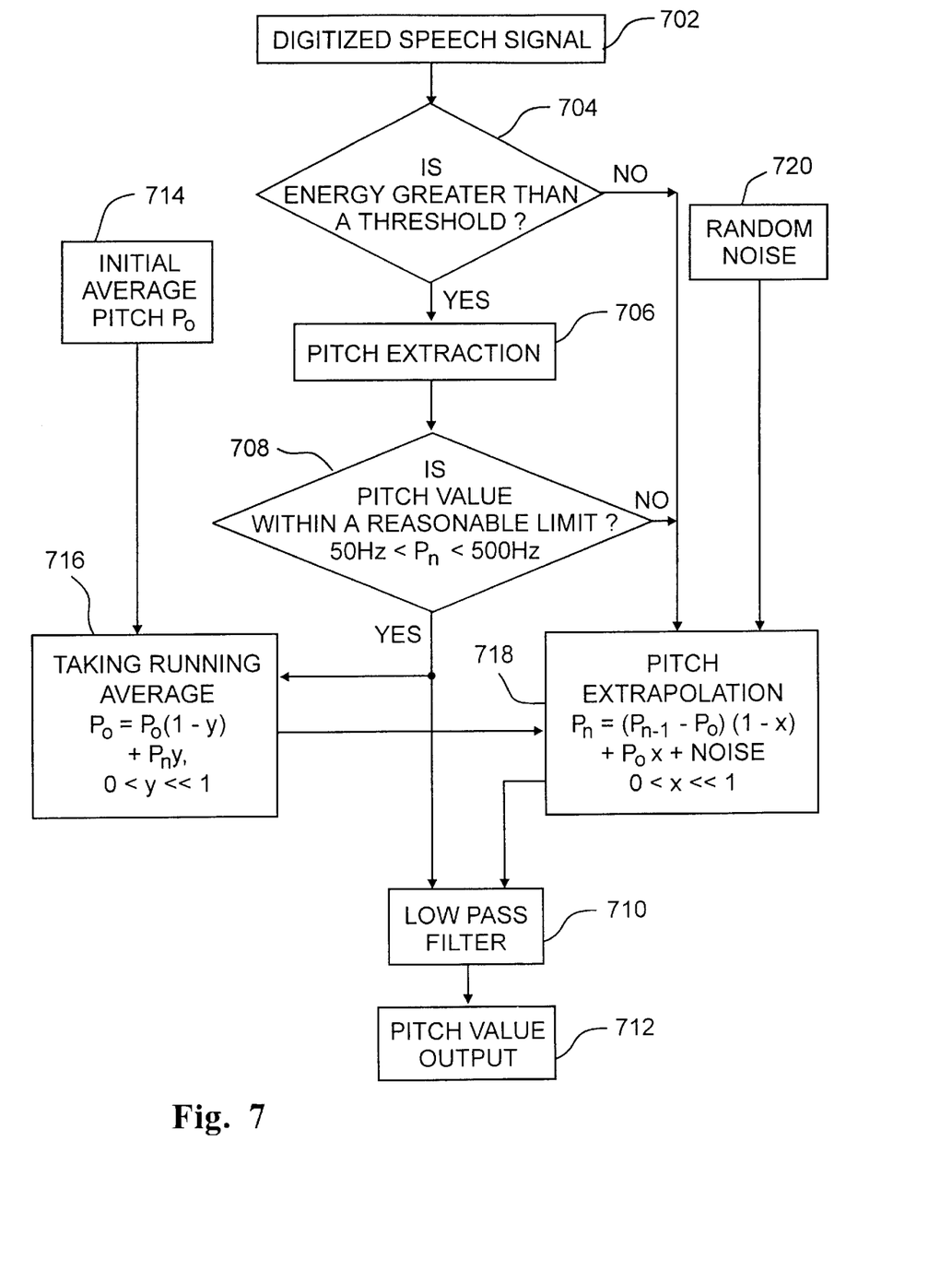
FIG. 7 is an exemplary illustration of a pitch extraction process according to an embodiment of the present invention.

Referring now to FIG. 7, a flow chart depicts the details of an exemplary algorithm for implementing the pitch extraction process executed by pitch extraction unit 205, according to an embodiment of the present invention. (See commonly assigned U.S. Pat. No. 5,751,905, which is incorporated by reference herein). The digitized speech signal (generated by A/D converter 203) is input at block 702. At block 704, it is determined whether the energy of a current frame is greater than a threshold, block 706. If signal energy is below a threshold, it indicates an absence of pitch and the need for extrapolation. If the energy is above the threshold, pitch extraction proceeds. Pitch extraction is accomplished by determining the instantaneous frequency of the frame. If the pitch value is within a reasonable limit, for example between 50 Hz and 500 Hz (the range of human speech, including male and female) block 708, the digitized speech signal passes through a low pass filter, block 710, to eliminate signal noise, and the pitch value is output, block 712.

A second input to the algorithm of FIG. 7 is an initial average pitch value $P_0$, block 714. A running average of the pitch is then computed, at block 716, as follows:

$$P_O = P_o(1-y) + P_n y,$$

$$0 < y << 1$$

where P0 is the running average pitch value, p0 is the initial pitch value, y is a small number to determine the time period of taking the average. Specifically, it is the inverse of the number of frames of the time period. The running average is then used to extrapolate a pitch signal.

A pitch value will be extrapolated at block 718 if either the energy of the digitized speech signal is below a threshold, block 704, or the pitch value of a digitized speech signal is not within a reasonable range, block 708. In either event, an extrapolated pitch signal will be computed as follows:

$$P_n = (P_{n-1} - p_0)(1-x) + P_0 x + \text{noise},$$

$$0 < x << 1$$

where $P_n$ is the instantaneous value at time n of the extrapolated pitch signal, $p_n-1$ is the pitch at the immediately preceding time, and x is another small number determining the time scale for extrapolation. Specifically, it is the inverse of the number of frames during the time period of exponential extrapolation. The noise component originates at noise generator 720.

After the extrapolated signal is computed, the extrapolated signal and the original digitized signal are summed and passed through a low pass filter, block 710.

An advantage of the present invention can be seen from an illustration of difference in the number of phonemes required with the prior speech recognition methods, such as one disclosed in U.S. Pat. No. 5,751,905, compared with the number of phonemes required with an illustrative method of the present invention.

1. Case of Mandarin

Figure 3:
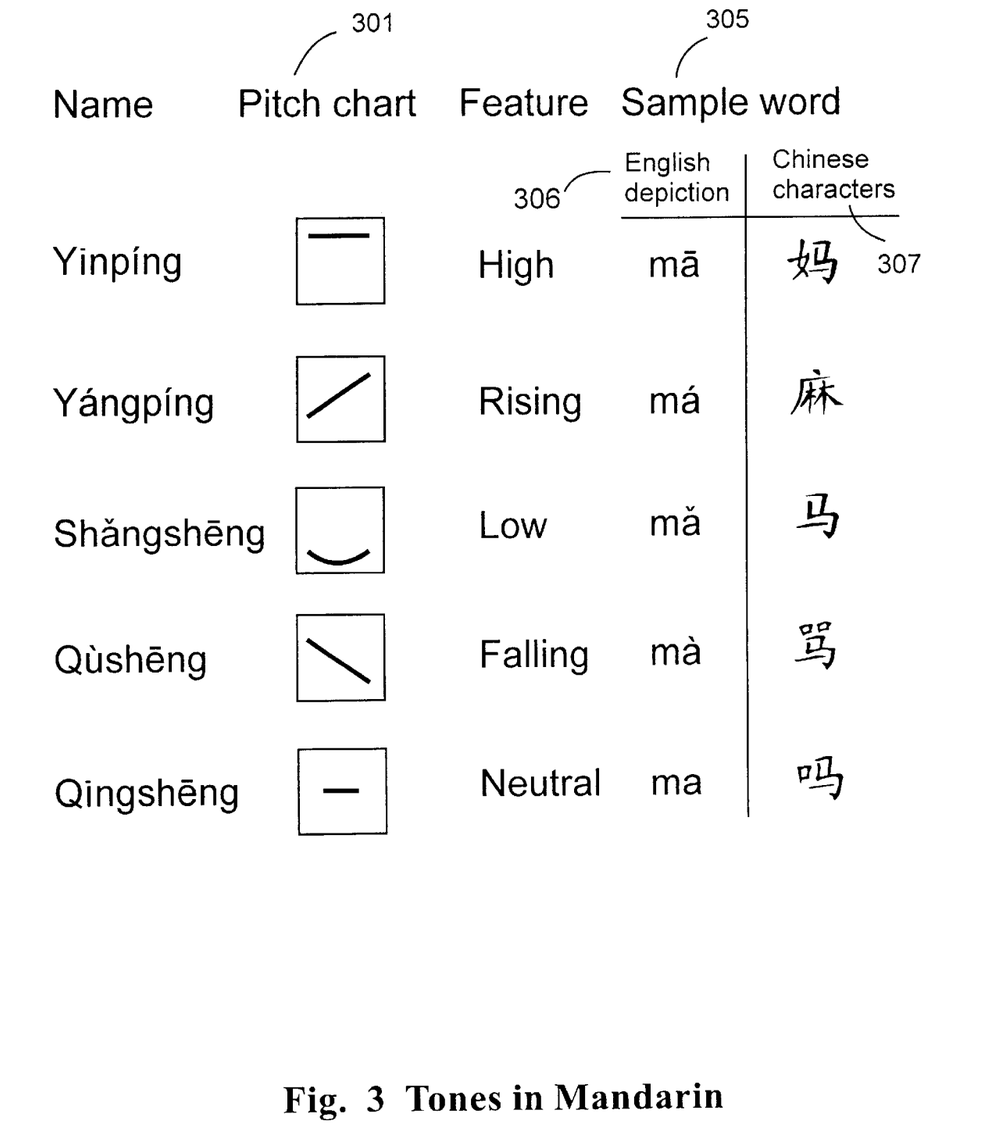
FIG. 3 is an exemplary illustration of the tone patterns of Mandarin.

Mandarin has five tones: yinping (high), yangping (rising), shangsheng (low), qusheng (falling), and qingsheng (neutral). Examples of typical pitch contours of these tones in continuous speech are shown in FIG. 3. Pitch chart 301 illustrates the symbols used to represent various pitches. Sample word 305 gives an English depiction 306 illustrating a word made up of one syllable with various pitch contours, as indicated in pitch chart 301. Chinese characters 307 depict Chinese characters corresponding to the various English depictions.

Figure 4:
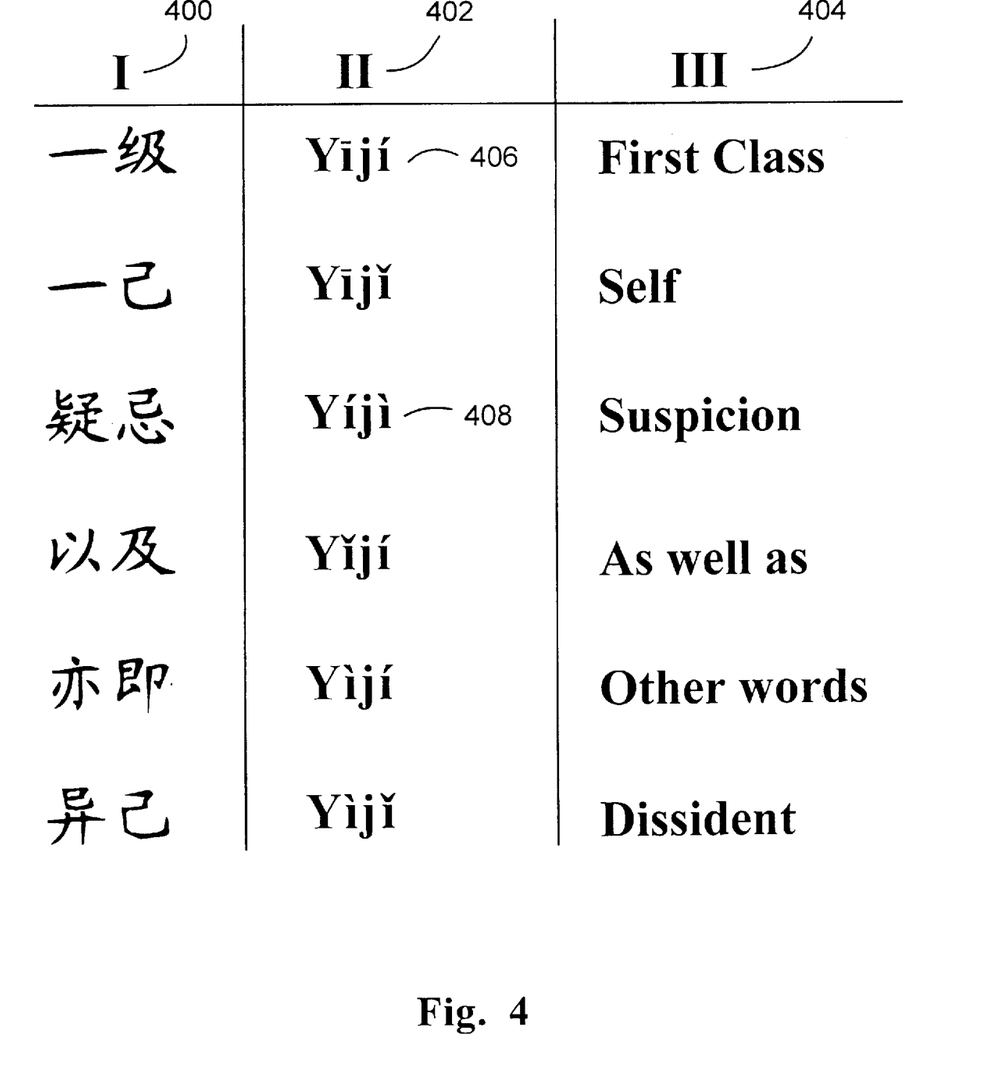
FIG. 4 illustrates an example of a set of words comprised of syllables having the same sequence of consonants and vowels but different pitch contours.

In tone languages such as Mandarin, syllables having the same sequence of consonants and vowels can have different meanings based on the syllable's pitch contour, or tone. FIG. 4 illustrates an example of a word comprised of syllables having the same sequence of vowels and consonants, but with very different meanings based on the tone of each individual syllable. Column I (400) depicts various Chinese characters corresponding to the varied meanings of the word "Yiji" in column II (402). Column III (404) depicts the corresponding English words. Although the sequence of consonants and vowels in the word "Yiji" remains unchanged, the tone of each syllable, specifically, "Yi" and "ji", has a different tone. Such varied tones within the same word results in very different meanings for that same word. For example, in 406, the first syllable has vowel "i" with a high tone. The second syllable "ji" has a vowel "i" with a rising tone. The combination of these two particular syllables with different tones results in a word that means "first class".

However, in 408 for example, the word "Yiji" is comprised of a first syllable "Yi" having a vowel with a rising tone, and a second syllable "ji" having a vowel with a falling tone. This combination results in a word that means "suspicion".

A speech recognition method according to an aspect of the present invention initially converts words of speech into an electrical signal. The signal processing unit generates a sequence of frames from the electrical signal, each frame comprising for example, 10 milliseconds. Each frame has 1 feature vector comprising, for example, 12 cepstral coefficients and a value of the log-relative-pitch. A stream of acoustic feature vectors is then input into a labeler. In an aspect of the present invention, each incoming acoustic feature vector is labeled automatically by comparison with the prototypes in the acoustic prototype database to find the closest matching phoneme. The labeling process simultaneously determines 1) whether a frame is a vowel or consonant 2) if the frame is a vowel, then which vowel it is, and 3) what tone that vowel belongs to.

Here, we describe how the tone of a vowel of the incoming speech (201) is recognized in the labeling step (207) by referring to the acoustic prototype database (208), according to an aspect of the present invention. First, pitch is one of the components of each acoustic feature vector (206) which represents a frame of the incoming speech. For frames belonging to the same vowel having different tones, the pitch values (205) of each frame are different. In the acoustic database (208), the prototypes of the same vowel having different tones are treated as different prototypes, belonging to different phonemes. Such a difference is established in the training process, as described in FIG. 6 below, which defines vowels with different tones as different phonemes. In the training process, acoustic feature vectors belonging to the same vowel having different tones are collected separately to form acoustic prototypes of different toned-vowels, or different tonemes. A toneme is defined as a phoneme having a specific tone in a tone language.

In the speech recognition process according to an aspect of the present invention, each incoming acoustic feature vector 206 (representing a frame), is compared with all the acoustic prototypes in the acoustic database 208, to find the closest matching prototype and consequently, the closest phoneme it represents. Because vowels of different tones are categorized as different phonemes, a result of the matching process is a closest matching toned-vowel, or a closest matching toneme to each acoustic feature vector.

The tone value of the vowel is used to determine the tone value of the syllable. Basically, this method utilizes the pitch information in the vowel of a syllable alone to predict the tone of the syllable. This method significantly reduces the total number of phonemes (which are required to recognize tonal languages), thus simplifying the training process a great deal and making the decoding process faster. In addition, the accuracy of this simplified method for recognizing Mandarin is comparable to the more complicated demisyllable method of the prior art, and in certain cases, even better. Moreover, the method of the present invention is also compatible for speech recognition for European languages.

To illustrate, the method and phoneme system described in U.S. Pat. No. 5,751,905 generated a total of 165 total phonemes (114 tonemes and 51 premes) for Mandarin Chinese (see Table I of U.S. Pat. No. 5,751,905).

However, using the method of the present invention, the number of phonemes required for recognizing Mandarin is reduced to only 72 (44 tonemes, 21 consonants, 3 semivowels and 4 codas), as illustrated in Table 1. It is to be appreciated that even when the number of phonemes are reduced by more than a factor of two, which occurs by applying the method of the present invention, decoding accuracy is virtually unchanged.

TABLE 1

Phonemes of Mandarin

Tonemes:

| A1 | A2 | A3 | A4 | A5 |
|----|----|----|----|----|
| E1 | E2 | E3 | E4 | E5 |
| EH1 | EH2 | EH3 | EH4 | EH5 |
|  | ER2 | ER3 | ER4 | ER5 |
| I1 | I2 | I3 | I4 | I5 |
| IH1 | IH2 | IH3 | IH4 | IH5 |
| O1 | O2 | O3 | O4 | O5 |
| U1 | U2 | U3 | U4 | U5 |
| YU1 | YU2 | YU3 | YU4 | YU5 |

Consonants:
B P M F D T N L Z C S ZH CH SH R J Q X G K H
Semivowels:
W Y V
Codas:
w y n ng In contrast with the 114 tonemes shown in Table I of U.S. Pat. No. 5,751,905, the tonemes of Table 1 above comprise only vowels alone with tonal content. The number of vowels in Mandarin is 9 (A,E, EH, ER, I, IH, O, U, YU). The number of tones in Mandarin is 5. Thus, assigning tonal content to each vowel alone in accordance with the present invention results in only 44 tonemes, or vowels having specific tones. Adding the 21 consonants, 3 semivowels and 4 codas of Mandarin to the above 44 tonemes results in a total of only 72 phonemes required to recognize Mandarin in accordance with the present invention.

Table 2 below is an exemplary illustration of the comparison of a syllable decomposition scheme for Mandarin of U.S. Pat. No. 5,751,905, as compared with a syllable decomposition scheme for Mandarin using the method of the present invention.

TABLE 2

Syllable Decomposition for Mandarin

| A) Syl. | B) U.S. Pat. No. 5,751,905 | C) Present invention |
|---------|----------------------------|----------------------|
| Chai1 | CH AI1 | CH A1 y |
| Chai2 | CH AI2 | CH A2 y |
| Chai3 | CH AI3 | CH A3 y |
| Chai4 | CH AI4 | CH A4 y |
| Chai | CH AI5 | CH A5 y |
| Chao1 | CH AO1 | CH A1 w |
| Chao2 | CH AO2 | CH A2 w |
| Chao3 | CH AO3 | CH A3 w |
| Chao4 | CH AO4 | CH A4 w |
| Chao | CH AO5 | CH A5 w |
| Chan1 | CH AN1 | CH A1 n |
| Chan2 | CH AN2 | CH A2 n |
| Chan3 | CH AN3 | CH A3 n |
| Chan4 | CH AN4 | CH A4 n |
| Chan | CH AN5 | CH A5 n |
| Chang1 | CH ANG1 | CH A1 ng |
| Chang2 | CH ANG2 | CH A2 ng |
| Chanq3 | CH ANG3 | CH A3 ng |
| Chang4 | CH ANG4 | CH A4 ng |
| Chang | CH ANG5 | CH A5 ng |
| Chuai1 | CHU AI1 | CH W A1 y |
| Chuai2 | CHU AI2 | CH W A2 y |
| Chuai3 | CHU AI3 | CH W A3 y |
| Chuai4 | CHU AI4 | CH W A4 y |
| Chuai | CHU AI5 | CH W A5 y |
| Chuan1 | CHU AN1 | CH W A1 n |
| Chuan2 | CHU AN2 | CH W A2 n |
| Chuan3 | CHU AN3 | CH W A3 n |
| Chuan4 | CHU AN4 | CH W A4 n |
| Chuan | CHU AN5 | CH W A5 n |
| Chuang1 | CHU ANG1 | CH W A1 ng |
| Chuang2 | CHU ANG2 | CH W A2 ng |
| Chuang3 | CHU ANG3 | CH W A3 ng |
| Chuang4 | CHU ANG4 | CH W A4 ng |
| Chuang | CHU ANG5 | CH W A5 ng |

Column A of Table 2 illustrates examples of various syllables of Mandarin. Each syllable has 1 of 5 tones; here the unnumbered syllable indicates a syllable having a neutral tone. Column B illustrates an example of the demisyllable method of U.S. Pat. No. 5,751,905 applied to the syllables given in Column A. For example, the first syllable "Chai" is split into 2 demisyllables, "Ch" and "ai", and tone is only determined for each entire second demisyllable, which comprises a main vowel and an ending. The tone of the first demisyllable is ignored.

Column C of Table 2 illustrates an exemplary application of a method according to an embodiment of the present invention. For example, for the syllable "Chai", a vowel "a" is identified and its tone is determined. Tone here is indicated by numbering 1–5, with 5 designating a neutral tone. The tone of both the consonants "Ch" and the ending "i" is ignored.

2. Case of Cantonese

To apply the method of dividing a syllable into demisyllables (as disclosed in U.S. Pat. No. 5,751,905) to Cantonese, an even larger number of phonemes must be defined. The reason is due to the fact that in Mandarin, while there is only a total of four codas (two consonant codas for all syllables (n and ng), plus semivowels y and w as codas), in Cantonese, there are eight possible codas (p, t, k, n, ng, m, y, and w). In addition, the number of possible tones in Mandarin, even including the neutral tone, is only five. In Cantonese, there are nine tones. Thus, using the above demisyllable method, about 300 phonemes must be defined in order to recognize Cantonese.

In contrast, by using the method in accordance with the present invention, it is sufficient to define only 88 phonemes to successfully recognize Cantonese, which speeds up both the training and decoding processes necessary for speech recognition. In addition, the accuracy of this simplified method is even better that the more complicated demisyllable method.

Figure 5:
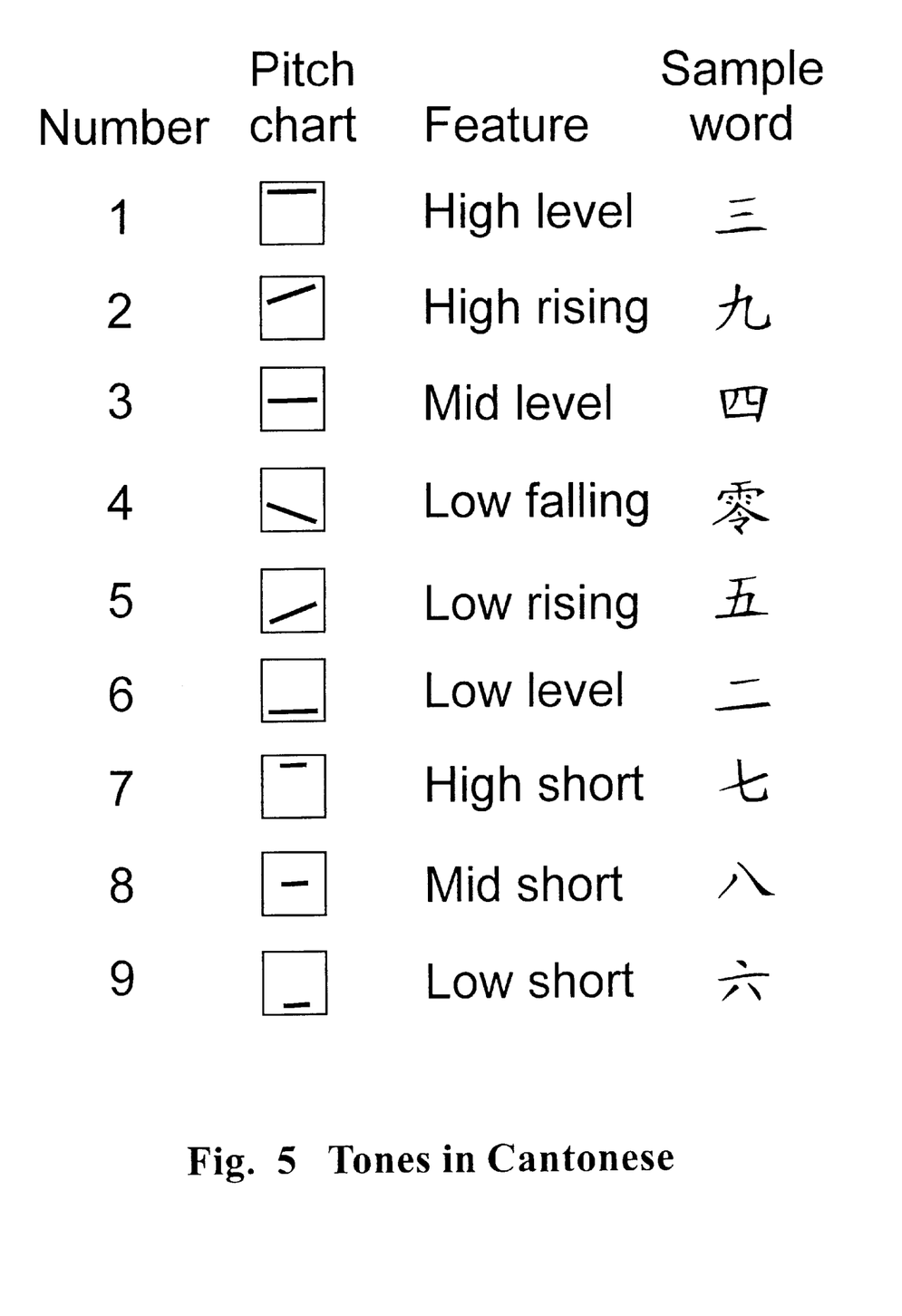
FIG. 5 is an exemplary illustration of the tone patterns of Cantonese.

The pitch contours of the nine tones of Cantonese are shown in FIG. 5. Using the concept of the method according to the present invention, the number of tones is reduced by combining the three short tones (Rusheng, tone numbers 7, 8, and 9) with other similar tones. In this example, the pitch values of those three Rusheng syllables are very similar to those of tone numbers 1, 3, and 6. By separating the codas of the syllables of tones 1, 3, and 6, the tone pattern of the vowels alone in tones 7, 8, and 9 are virtually identical to the tone patterns in tones 1, 3, and 6. Thus, each vowel alone can have six tones associated with it, instead of nine. In other words, the vowels of tones 7, 8, and 9 can be identified with the vowels of tones 1, 3, and 6.

Using this improved method of the present invention, the resulting 88 Cantonese phonemes are comprised of the following:

The 60 Cantonese tonemes (main vowels with tone) are:

| A1  | A2  | A3  | A4  | A5  | A6  |
| --- | --- | --- | --- | --- | --- |
| AA1 | AA2 | AA3 | AA4 | AA5 | AA6 |
| E1  | E1  | E3  | E4  | E5  | E6  |
| I1  | I2  | I3  | I4  | I5  | I6  |
| O1  | O2  | O3  | O4  | O5  | O6  |
| EU1 | EU2 | EU3 | EU4 | EU5 | EU6 |
| U1  | U2  | U3  | U4  | U5  | U6  |
| V1  | V2  | V3  | V4  | V5  | V6  |
| M1  | M2  | M3  | M4  | M5  | M6  |
| NG1 | NG2 | NG3 | NG4 | NG5 | NG6 |

The Cantonese initial consonants are:

| GS | B | CH | D | F  | G | GW | H | J | K |
| -- | - | -- | - | -- | - | -- | - | - | - |
| KW | L | M  | N | NG | P | S  | T | W | Y |

The Cantonese codas are:

| p | t | k | n | ng | m | y | w |
| - | - | - | - | -- | - | - | - |

3. Inclusion of Additional Information to Determine the Tone of a Syllable Besides the Pitch Values on a Vowel Although the pitch information of a vowel alone of a syllable provides substantial information about the tone of the syllable, other parts of the syllable also contain tone information. For example, the pitch information of the codas may also be used to make a more precise prediction of the tone of the syllable. In the case of Mandarin, the pitch value of the coda is either high (for yinping and yangping), or low (for shangsheng and qusheng). Table 4 illustrates an exemplary syllable decomposition table for Mandarin where the coda phonemes "y" and "n" are split into two categories, "1" representing a high pitch, and "2" representing a low pitch.

TABLE 4

Syllable Decomposition for Mandarin, Including the Pitch Information in the Coda

| Syllable | Old | New |
| --- | --- | --- |
| Chai | CH AI1 | CH A1 y1 |
| Chai | CH AI2 | CH A2 y1 |
| Chai | CH AI3 | CH A3 y2 |
| Chai | CH AI4 | CH A4 y2 |
| Chan | CH AN1 | CH A1 n1 |
| Chan | CH AN2 | CH A2 n1 |
| Chan | CH AN3 | CH A3 n2 |
| Chan | CH AN4 | CH A4 n2 |
| Chuai | CHU AI1 | CH W A1 y1 |
| Chuai | CHU AI2 | CH W A2 y1 |
| Chuai | CHU AI3 | CH W A3 y2 |
| Chuai | CHU AI4 | CH W A4 y2 |
| Chuan | CHU AN1 | CH W A1 n1 |
| Chuan | CHU AN2 | CH W A2 n1 |
| Chuan | CHU AN3 | CH W A3 n2 |
| Chuan | CHU AN4 | CH W A4 n2 |

Because there are only 4 different codas in Mandarin, by splitting all the codas into two sets according to pitch, only 4 additional phonemes are required using the method of the present invention, which still results in a number of phonemes of Mandarin that is much less than the total number of phonemes required using the demisyllable method of the prior art.

Figure 6:
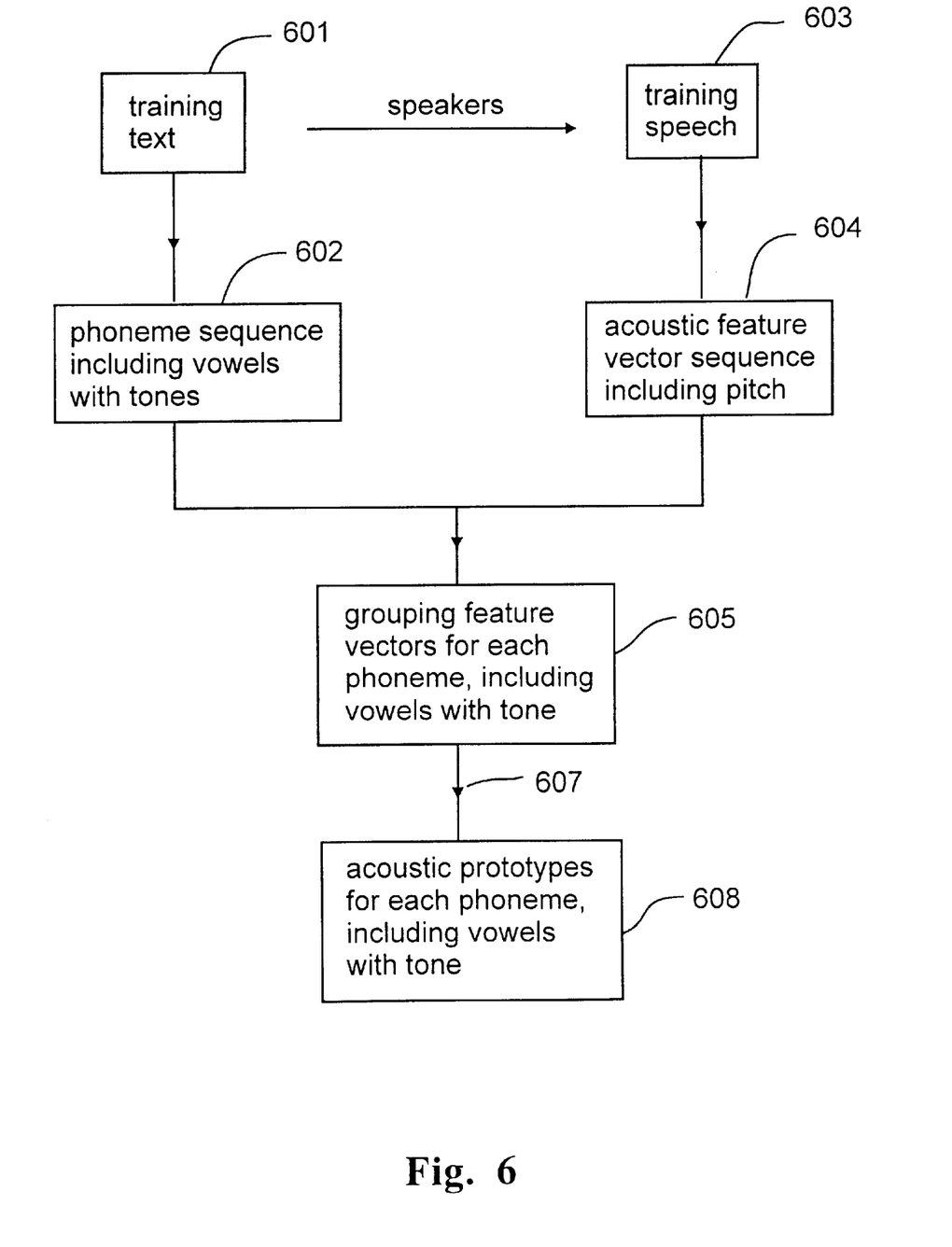
FIG. 6 is a flow diagram of the training process according to an embodiment of the present invention.

FIG. 6 depicts a flow chart illustrating an exemplary training process for generating the acoustic prototype database 208 according to an aspect of the present invention. Initially, a large set of training text is prepared (step 601). The text is transcribed into sequences of phonemes, including vowels with tones (step 602). In step 603, speakers are asked to read the training text to make voice records (training speech). The acoustic feature vectors of the speech are then computed frame by frame (step 604). These acoustic feature vectors include pitch as a component.

A sequence of frames of acoustic feature vectors is then compared with the phonemes of the text to group each frame together with its corresponding phoneme (step 605). The means and variances of each component of the feature vector for each phoneme, including the vowels with tone, are then computed. (step 607). (To illustrate, a 13 dimension feature vector comprising 12 cepstral coefficients and 1 pitch value has 13 components.) In this way, the acoustic prototypes for each phoneme, including the vowels with tone, are generated (step 608). These acoustic prototypes are stored in acoustic prototype database 208.

The phonemes of the same vowel with different tones may have identical spectral features but different pitch values. The acoustic feature vectors of a same vowel with different tones are collected separately to form acoustic prototypes of different toned vowels, or different tonemes.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. A method for identifying toned vowels in words of speech comprising:
   converting the words of speech into an electrical signal;
   generating spectral features from said electrical signal;
   extracting pitch values from said electrical signal;
   combining said spectral features and said pitch values into acoustic feature vectors;
   comparing said acoustic feature vectors with prototypes of phonemes in an acoustic prototype database including prototypes of toned vowels to produce labels; and
   matching said labels to text using a decoder comprising a phonetic vocabulary and a language model database.

2. The method of claim 1 further comprising the step of constructing the acoustic prototypes, wherein the step of constructing comprises the steps of:
   preparing a training text from said words of speech;
   transcribing said training text into sequences of phonemes including vowels with tones;
   converting spoken utterances of said training text into an electrical signal;
   generating spectral features from said electrical signal;
   extracting pitch values from said electrical signal;
   combining said spectral features and said pitch values into acoustic feature vectors;
   comparing said acoustic feature vectors with said sequences of phonemes including vowels with tone to produce acoustic prototypes for each phoneme.

3. The method of claim 2, wherein said acoustic prototypes are stored in a database.

4. The method of claim 1, wherein said phonetic vocabulary comprises a database of words of speech including tone information.

5. The method of claim 1, wherein said language model database is used to determine a probability of a word.

6. The method of claim 1, wherein said words of speech comprise at least one syllable having tonal content.

7. The method of claim 6, wherein said toned vowel determines a tone of said syllable.

8. A program storage device readable by machine, tangibly embodying a program of instructions executable by machine to perform the method steps for identifying toned vowels in words of speech, the method comprising the steps of:
   converting the words of speech into an electrical signal;
   generating spectral features from said electrical signal;
   extracting pitch values from said electrical signal;
   combining said spectral features and said pitch values into acoustic feature vectors;
   comparing said acoustic feature vectors with prototypes of phonemes in an acoustic prototype database including prototypes of toned vowels to produce labels; and
   matching said labels to text using a decoder comprising a phonetic vocabulary and a language model database.

9. The program storage device of claim 8, further comprising instructions for performing the step of constructing the acoustic prototypes, wherein the instructions for constructing the acoustic prototypes comprise instructions for performing the steps of:
   receiving as input a training text from said words of speech;
   transcribing said training text into sequences of phonemes including vowels with tones;
   converting spoken utterances of said training text into an electrical signal;
   generating spectral features from said electrical signal;
   extracting pitch values from said electrical signal;
   combining said spectral features and said pitch values into acoustic feature vectors;
   comparing said acoustic feature vectors with said sequences of phonemes including vowels with tone to produce acoustic prototypes for each phoneme.

10. The program storage device of claim 9, wherein said acoustic prototypes are stored in a database.

11. The program storage device of claim 8, wherein said phonetic vocabulary comprises a database of words of speech including tone information.

12. The program storage device of claim 8, wherein said language model database is used to determine a probability of a word.

13. The program storage device of claim 8, wherein said words of speech comprise at least one syllable having tonal content.

14. The program storage device of claim 8, wherein said toned vowel determines a tone of said syllable.

15. A system for identifying toned vowels in words of speech, comprising:
   means for converting the words of speech into an electrical signal;
   means for generating spectral features from said electrical signal;
   means for extracting pitch values from said electrical signal;
   means for combining said spectral features and said pitch values into acoustic feature vectors;
   means for comparing said acoustic feature vectors with prototypes of phonemes in an acoustic prototype database including prototypes of toned vowels to produce labels; and
   means for matching said labels to text using a decoder comprising a phoneic vocabulary and a language model database.

16. The system of claim 15, wherein said phonetic vocabulary comprises a database of word of speech including tone information.

17. The system of claim 15, wherein said language model database is used to determine a probability of a word.

18. The system of claim 15, wherein said words of speech comprise at least one syllable having tonal content.

19. The system of claim 18, wherein said toned vowel determines a tone of said syllable.

* * * * *